(12) United States Patent
Mehta et al.

(10) Patent No.: US 6,995,208 B2
(45) Date of Patent: Feb. 7, 2006

(54) CLEARCOAT COMPOSITION FOR PRIMERLESS MVSS ADHESION

(75) Inventors: Sanjay Mehta, Rochester Hills, MI (US); David J. Santure, Novi, MI (US); John A. Gilbert, Beverly Hills, MI (US)

(73) Assignee: BASF Corporation, Southfield, MI (US)

( * ) Notice: Subject to any disclaimer, the term of this patent is extended or adjusted under 35 U.S.C. 154(b) by 100 days.

(21) Appl. No.: 10/015,094

(22) Filed: Dec. 11, 2001

(65) Prior Publication Data

US 2004/0254307 A1 Dec. 16, 2004

(51) Int. Cl.
*C08K 5/16* (2006.01)

(52) U.S. Cl. .............. 524/714; 524/796; 524/850; 526/317.1; 526/302; 526/310; 526/312; 526/301; 526/332

(58) Field of Classification Search .......... 524/714, 524/796, 850, 317.1, 302, 312, 301, 332; 526/317.1, 302, 310, 312, 301, 332
See application file for complete search history.

(56) References Cited

U.S. PATENT DOCUMENTS

| | | | |
|---|---|---|---|
| 2,979,514 A | 4/1961 | O'Brien et al. | |
| 3,479,328 A | 11/1969 | Nordstrom | |
| 3,674,838 A | 7/1972 | Nordstrom | |
| 4,126,747 A | 11/1978 | Cowherd, III et al. | |
| 4,279,833 A | 7/1981 | Culbertson et al. | |
| 4,340,497 A | 7/1982 | Knopf | |
| 4,643,794 A | 2/1987 | Saracsan et al. | |
| 4,758,632 A | 7/1988 | Parekh et al. | |
| 5,115,086 A | 5/1992 | Hsieh | |
| 5,147,927 A | 9/1992 | Baghdachi et al. | |
| 5,238,993 A | 8/1993 | Hsieh | |
| 5,356,669 A | 10/1994 | Rehfuss et al. | |
| 5,412,049 A | 5/1995 | Argyropoulos et al. | |
| 5,976,615 A * | 11/1999 | Menovcik et al. | 427/140 |
| 6,160,058 A | 12/2000 | Ohrbom et al. | 525/481 |

FOREIGN PATENT DOCUMENTS

| | | |
|---|---|---|
| WO | WO 94/10211 | 5/1994 |
| WO | WO 94/10211 | 11/1994 |
| WO | WO 00/26315 | 11/2000 |

OTHER PUBLICATIONS

U.S. Appl. No. 09/741,511, filed Dec. 19, 2000.
Copy of the International Search Report PCT/US 02/29487 filed Sep. 16, 2002.

* cited by examiner

*Primary Examiner*—William K. Cheung

(57) ABSTRACT

The invention provides a clearcoat coating composition containing either one acrylic polymer with secondary hydroxyl functionality and carbamate functionality or two acrylic polymers, the first having secondary hydroxyl functionality and the second having carbamate functionality; a carbamate-functional or urea-functional material that is the reaction product of (1) a compound comprising a primary carbamate or primary urea group and an hydroxyl group and (2) a compound that is reactive with hydroxyl groups on a plurality of molecules of compound (1), but that is not reactive with the carbamate or urea groups on compound (1); and a crosslinking component including an aminoplast crosslinker. A windshield sealant can be applied directly to the clearcoat layer produced from the composition without the need for a special primer layer.

30 Claims, No Drawings

CLEARCOAT COMPOSITION FOR PRIMERLESS MVSS ADHESION

FIELD OF THE INVENTION

This invention concerns thermoset clearcoat compositions, especially for automotive vehicles.

BACKGROUND OF THE INVENTION

Automotive clearcoats must be many performance requirements. They must be smooth and glossy to provide the desired aesthetic appeal. They must also be durable, both to preserve the coating appearance and to protect the steel substrate, by resisting scratching and marring and also degradation from UV light in sunlight, environmental etching, and heat. But the clearcoat has at least one important safety performance requirement, also. Windshields and other stationary glass are adhered to the coated vehicle frame with a bonding adhesive. The clearcoat must form a strong bond with the materials on either side to pass the federal motor vehicle safety standards (MVSS 212) Crash Barrier test, which tests, among other things, the crashworthiness of the windshield and other stationary glass installation. In crash and roll-over situations, the windshield, rear window, and other stationary glass panels may provide additional support of the vehicle roof and must remain bonded to the vehicle body. In the past, a tape masking process has been used or a special primer has been applied between the clearcoat and the windshield sealant to obtain the desired bond strength.

Saracsan et al., U.S. Pat. No. 4,643,794, describe using a primer to join a clearcoated metal surface of the vehicle and the glass surface. The primer comprises a dispersion of a linear polyester resin, a polyisocyanate crosslinking agent, carbon black, and a volatile organic solvent. A sealant is applied to the primed surface and the metal and glass surfaces are then joined.

Baghdachi et al, U.S. Pat. No. 5,147,927, describes a moisture-curable polyurethane sealant that can be applied to electrocoat primed metal substrates without an additional primer layer. While the Baghdachi process does not require adhesion between clearcoat and sealant, it remains the general desire of automotive manufacturers to attach the fixed glass windshield panels over the clearcoat layer, not the electrocoat primer layer. The Baghdachi sealant composition is formulated specifically for application over the electrocoat primer and does not provide direction for achieving adhesion between a clearcoat layer and a glass sealant.

Considerable research has gone into making clearcoat more resistant to environmental etch-type degradation. Hsieh, U.S. Pat. Nos. 5,238,993 and 5,115,086 describe primer compositions that have been specifically formulated to be applied between environmental etch-resistant clearcoats and the glass sealant for the windshield. The compositions includes a polyester, a particular aromatic polyisocyanate, and in the '993 patent, a silane-containing moiety. The Hsieh patents do not provide direction for eliminating the need for a primer layer.

Eliminating the primer layer would be beneficial for simplifying the manufacturing process, as the steps of application and curing of the windshield primer could be eliminated, along with the equipment necessary for these steps and the regulated emissions resulting from these steps.

SUMMARY OF THE INVENTION

The invention provides a clearcoat coating composition for automotive exterior coatings to which a stationary glass bonding adhesive can be applied directly without first applying a special primer. The thermosetting clearcoat coating composition includes either one acrylic polymer with secondary hydroxyl functionality and carbamate or urea functionality or two acrylic polymers, the first having secondary hydroxyl functionality and the second having carbamate or urea functionality; and a crosslinking component including an aminoplast crosslinker. The clearcoat coating composition further includes a carbamate-functional or urea-functional material that is the reaction product of (1) a compound comprising a primary carbamate or primary urea group and an hydroxyl group and (2) a compound that is reactive with hydroxyl groups on a plurality of molecules of compound (1), but that is not reactive with the carbamate or urea groups on compound (1).

The invention further provides a method of assembling an automotive vehicle, in which the clearcoat coating composition of the invention is applied to the exterior of the vehicle and cured to produce a cured clearcoat, then a glass bonding adhesive is applied directly to the cured clearcoat. A stationary glass panel, such as a windshield, is attached to the adhesive.

The clearcoat coating composition produces a clearcoat layer that has excellent appearance, environmental etch resistance, and resistance to scratch and mar, as well as providing excellent MVSS adhesion without the use of a special windshield primer.

DETAILED DESCRIPTION OF THE PREFERRED EMBODIMENTS

The following description of the preferred embodiment(s) is merely exemplary in nature and is in no way intended to limit the invention, its application, or uses.

le;.5qThe clearcoat coating composition includes secondary hydroxyl groups on an acrylic polymer and carbamate or urea groups on an acrylic polymer. The secondary hydroxyl groups and carbamate or urea groups can be on the same acrylic polymer or on different acrylic polymers. A carbamate group according to the invention may be represented by the structure

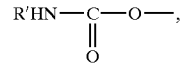

in which R' is H or alkyl. Preferably, R' is H or alkyl of from 1 to about 4 carbon atoms, and more preferably R' is H (a primary carbamate). A urea group may be represented by the structure

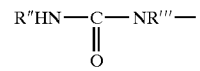

in which R" and R'" are each independently H or alkyl or R" and R'" together form a heterocyclic ring structure. Preferably, R" and R'" are each independently or together form an ethylene bridge, and more preferably R" and R'" are each H (a primary urea). A secondary hydroxyl group according to the invention is a hydroxyl group bound to an alkylene carbon, i.e., a carbon that is bound to two further carbon atoms.

In general, an acrylic polymer with carbamate or urea groups may be prepared in two ways. First, the acrylic polymer with carbamate or urea groups may be prepared by polymerization using a monomer having a carbamate or urea group. Secondly, the acrylic polymer may be prepared by polymerization of a monomer having functionality that can be converted to or adducted with carbamate or urea functionality after polymerization. Any of the methods described in U.S. Pat. No. 6,160,058, the disclosure of which is incorporated herein by reference, may be used.

In the first method, the acrylic polymer is prepared by polymerization of a monomer having carbamate or urea groups. For example, U.S. Pat. No. 5,412,049, incorporated herein by reference, discloses polymerization of the reaction product of an hydroxyl (meth)acrylate ester of an hydroxyalkyl carbamate compound.

In another embodiment of the first method, the acrylic polymer may be polymerized with a β-hydroxy carbamate monomer having the structure

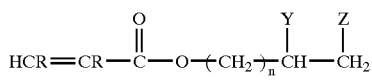

in which either each R is hydrogen or one R is hydrogen and the other R is methyl; n is from 1 to about 4, preferably 1; and one of Y and Z is OH and the other of Y and Z is a carbamate or urea group as already defined. In a typical synthesis of such a monomer, the reaction kinetics produces a product that is a mixture of the compounds in which Y is hydroxyl and Z is hydroxyl. When Y is the hydroxyl group, the monomer also provides a secondary hydroxyl group for the acrylic polymer.

One way of preparing a β-hydroxy carbamate monomer of this structure is by reacting a glycidyl-group containing polymerizable monomer first with carbon dioxide to convert the oxirane group to a cyclic carbonate group, and then with ammonia or a primary amine to convert the cyclic carbonate group to a β-hydroxy carbamate group. Examples of suitable oxirane group-containing polymerizable monomers include, without limitation, glycidyl acrylate, glycidyl methacrylate, glycidyl crotonate, and allyl glycidyl ether. Oxirane groups can be converted to carbamate groups by first converting to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60–150° C. Useful catalysts include any that activate an oxirane ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like. The cyclic carbonate group is reacted with ammonia or a primary amine. The primary amine preferably has up to four carbons, e.g. methyl amine. Preferably, the cyclic carbonate is reacted with ammonia. The ammonia may be aqueous ammonia (i.e., $NH_4OH$). The reaction ring-opens the cyclic carbonate to form a β-hydroxy carbamate monomer.

Another method of preparing a carbamate-functional monomer is by reacting a hydroxy-functional, ethylenically unsaturated monomer with cyanic acid, which may be formed by the thermal decomposition of urea or cyanuric acid. A further method is by reacting an isocyanate-functional or acid-functional ethylenically unsaturated monomer can be reacted with a hydroxyalkyl carbamate compound, such as hydroxypropyl carbamate, a hydroxy containing urea compound, such as hydroxyethylethylene urea, or with a hydroxy-containing epoxide compound with the epoxide group being subsequently converted to a carbamate group as described above. In a still further method, an hydroxyl-functional ethylenically unsaturated monomer may be reacted with an alkyl carbamate in a transesterification reaction to introduce the carbamate group. Another way to form a carbamate-functional, ethylenically unsaturated monomer is by reacting an acid-functional, ethylenically unsaturated monomer with an epihalohydrin compound, then reacting the oxirane group with carbon dioxide to form the carbonate, then reacting the carbonate ring with ammonia or a primary amine to form a primary carbamate or secondary carbamate, respectively. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Further details of synthesizing monomers having carbamate functionality are described, for example, in U.S. Pat. Nos. 3,479,328, 3,674,838, 4,126,747, 4,279,833, 4,340,497, and 5,356,669 and WO 94/10211, the disclosures of each of which are incorporated herein by reference.

In the second method, an acrylic polymer is prepared having a functional group that is reacted after polymerization to provide a carbamate or urea group. U.S. Pat. Nos. 4,758,632 and 5,356,669, the disclosures of each of which are incorporated herein by reference, describe preparing a polymer backbone having appended thereto at least one carbamate-functional group in this way. One technique involves thermally decomposing urea (to give off ammonia and HNCO) or cyanuric acid in the presence of a hydroxy-functional acrylic polymer to form a carbamate-functional acrylic polymer. If the hydroxyl groups are secondary, the secondary hydroxyl groups may be in excess to provide an acrylic polymer having both carbamate and secondary hydroxyl groups. Another technique involves reacting the hydroxyl group of a hydroxyalkyl carbamate with isocyanate groups or carboxylic acid groups on the acrylic polymer. Isocyanate-functional acrylics are prepared by polymerization of Isocyanate vinyl monomers, which include unsaturated m-tetramethyl xylene isocyanate and isocyanatoethyl methacrylate. Examples of carboxylic acid functional acrylic polymers include those prepared by polymerization of acrylic acid, methacrylic acid, crotonic acid, and maleic anhydride which is hydrolyzed after synthesis. Yet another technique is to react the cyclic carbonate group on a cyclic carbonate-functional polymer with ammonia or a primary amine to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional polymer with an alkyl carbamate. A more difficult, but feasible way of preparing the polymer would be to transesterify a polymer with a hydroxyalkyl carbamate. Again in these two methods, when the hydroxyl group is a secondary hydroxyl group and is in excess, the resulting acrylic polymer has both secondary hydroxyl groups and carbamate groups. A further method is to react a glycidyl group-containing acrylic polymer with carbon dioxide to produce a cyclic carbonate group, and then with ammonia or a primary amine as before to provide the carbamate functionality. Glycidyl-group containing acrylic polymers can be produced by copolymerzing glycidyl acrylate, glycidyl methacrylate, or allyl glycidyl ether, for example.

An acrylic polymer having secondary hydroxyl functionality may be prepared by copolymerizing a monomer having secondary hydroxyl functionality, for example and without limitation, 3-hydroxybutyl acrylate, 3-hydroxybutyl methacrylate, 2-hydroxypropyl acrylate, 2-hydroxypropyl methacrylate, and the β-hydroxy esters formed by reaction of a glycidyl-functional monomer with monocarboxylic acid or by reaction of a carboxylic acid-functional monomer with a monoglycidyl compound, including glycidyl esters, glycidyl ethers, and cycloaliphatic epoxides.

The acrylic polymer or polymers having secondary hydroxyl functionality and carbamate or urea functionality may be polymerized using one or more comonomers. Examples of such comonomers include, without limitation, α,β-ethylenically unsaturated monocarboxylic acids containing 3 to 5 carbon atoms such as acrylic, methacrylic, and crotonic acids and the esters of those acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The comonomers may be used in any combination.

The acrylic polymer or polymers may be prepared using conventional techniques, such as by heating the monomers in the presence of a polymerization initiating agent and optionally chain transfer agents. The polymerization is preferably carried out in solution, although it is also possible to polymerize the acrylic polymer in bulk. Suitable polymerization solvents include, without limitation, esters, ketones, ethylene glycol monoalkyl ethers and propylene glycol monoalkyl ethers, alcohols, and aromatic hydrocarbons.

Typical initiators are organic peroxides such as dialkyl peroxides such as di-t-butyl peroxide, peroxyesters such as t-butyl peroctoate and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol, and dimeric alpha-methyl styrene.

The solvent or solvent mixture is generally heated to the reaction temperature and the monomers and initiator(s) and optionally chain transfer agent(s) are added at a controlled rate over a period of time, typically from about two to about six hours. The polymerization reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes, more preferably no more than about five minutes. Additional solvent may be added concurrently. The mixture is usually held at the reaction temperature after the additions are completed for a period of time to complete the polymerization. Optionally, additional initiator may be added to ensure complete conversion of monomers to polymer.

The acrylic polymer or polymers should have a weight average molecular weight of at least about 2400, preferably at least about 3000, more preferably at least about 3500, and particularly preferably at least about 4000. Weight average molecular weight may be determined by gel permeation chromatography using polystyrene standard. In addition, the weight average molecular weight is preferably up to about 5000, more preferably up to about 4750, and still more preferably up to about 4500. The acrylic polymer having secondary hydroxyl functionality has an hydroxyl equivalent weight, based on the secondary hydroxyl groups, of preferably up to about 600 grams per equivalent, more preferably up to about 400 grams per equivalent, and even more preferably up to about 300 grams per equivalent. The hydroxyl equivalent is preferably at least about 150 grams per equivalent. The acrylic polymer having carbamate or urea functionality has an equivalent weight, based on the carbamate or urea functionality or combination of the two, of preferably up to about 700 grams per equivalent, more preferably up to about 500 grams per equivalent, and even more preferably up to about 425 grams per equivalent. The carbamate and/or urea equivalent weight is preferably at least about 350 grams per equivalent.

The clearcoat coating composition further includes a carbamate-functional or urea-functional material that is the reaction product of (1) a compound comprising a primary carbamate or primary urea group and an hydroxyl group and (2) a compound that is reactive with hydroxyl groups on a plurality of molecules of compound (1), but that is not reactive with the carbamate or urea groups on compound (1). The compound (1) may be, for example and without limitation, hydroxyethyl carbamate, hydroxypropyl carbamate, or hydroxybutyl carbamate. The compound (2) is preferably a diisocyanate, triisocyanate, isocyanurate or biuret thereof, mixture of such compounds. Particularly preferred compounds (2) are the isocyanurate of isophorone diisocyanate and the isocyanurate of hexamethylene diisocyanate.

The carbamate-functional compound that is the reaction product of compounds (1) and (2) is included in the clearcoat composition in an amount of about 5 weight percent to about 30 weight percent, preferably form about 10 weight percent to about 15 weight percent, based on the vehicle weight. The "vehicle weight" is the total weight of the thermoset, film-forming components in the coating composition.

The clearcoat coating composition may include further carbamate-functional compounds. Such carbamate-functional compounds include, without limitation, any of those described in U.S. Pat. Nos. 6,160,058, 6,084,038, 6,080,825, 5,994,479, the disclosures of which are incorporated by reference. In particular, the composition may include a carbamate-functional or urea-functional material comprising at least two functional groups, at least one of which is a carbamate or urea group that is the reaction product of (1) an hydroxyl group of a first compound that is the result of a ring-opening reaction between a compound with an epoxy group and a compound with an organic acid group and (2) cyanic acid or a carbamate or urea group-containing compound.

In another embodiment, the clearcoat composition may include a carbamate-functional or urea-functional material that is the reaction product of (1) a compound comprising a carbamate or urea group and an active hydrogen group that is reactive with (2), and (2) a lactone or a hydroxy carboxylic acid. In a particularly preferred embodiment, the active hydrogen group of compound (1) is an hydroxyl group and the compound (2) is ε-caprolactone. The compound (1) may be, for example and without limitation, hydroxyethyl carbamate, hydroxypropyl carbamate, or hydroxybutyl carbamate.

In another embodiment, the clearcoat composition may include a carbamate-functional or urea-functional material that is the reaction product of a first material (A) that is prepared by reacting (1) a compound comprising a primary carbamate or primary urea group and an hydroxyl group and (2) a lactone or a hydroxy carboxylic acid, as just described, further reacted with a second material (B) that is reactive with hydroxyl groups on a plurality of molecules of compound (A), but that is not reactive with the carbamate or urea groups on compound (A). For example, the compound (B) may be a polyisocyanate, especially an isocyanate, particularly the isocyanurate of isophorone diisocyanate. Again, the compound (2) is preferably ε-caprolactone.

In yet another embodiment, the clearcoat composition may include a carbamate-functional or urea-functional material that is the reaction product of a first material (A) that is prepared by reacting (1) a compound comprising a primary carbamate or primary urea group and an hydroxyl group and (2) a lactone or a hydroxy carboxylic acid, as just described, further reacted with a second material or materials (B) that converts an hydroxyl group on the reaction product to a carbamate group, or a component comprising a group that is reactive with a hydroxyl group and a carbamate or urea group or group that can be converted to carbamate or urea. The hydroxyl group can be reacted, for example, without limitation, with monoisocyanates such as methyl isocyanate and butyl isocyanante, which react to form a secondary carbamate group; cyanic acid (which can be formed by the thermal decomposition of urea), which reacts with hydroxyl groups to form a primary carbamate group; or phosgene, followed by reaction with ammonia (primary carbamate group) or a primary amine (secondary carbamate group).

In another preferred embodiment, the clearcoat composition includes a carbamate-functional or urea-functional material that is the reaction product of (1) a first material that is the reaction product of a mixture including at least a polyisocyanate and an active hydrogen-containing chain extension agent with (2) a compound comprising a group that is reactive with said first material and a carbamate group or group that can be converted to carbamate. Suitable examples of the material (1) include, without limitation, the reaction product of a mixture including at least one of a diisocyanate, triisocyanate, isocyanurate or biuret thereof, mixture of such compounds, and at least one chain extension agent selected from 1,6-hexanediol, cyclohexanedimethylol, 2-ethyl-1,6-hexanediol, 3-hydroxy-2,2-dimethylpropyl 3-hydroxy-2,2-dimethylpropionate, 1,4-butanediol, and mixtures thereof. Suitable examples of compound (2) include, without limitation, hydroxyethyl carbamate, hydroxybutyl carbamate, hydroxypropyl carbamate, and combinations of these.

In a preferred embodiment, the clearcoat coating composition may further include a material as described in copending U.S. patent application Ser. No. 09/741,511, filed Dec. 19, 2000, incorporated herein by reference. The clearcoat coating composition particularly includes a carbamate-functional material having at least two carbamate groups, preferably two to four carbamate groups, and more preferably two carbamate groups and a hydrocarbon moiety with about 24 to about 72 carbon atoms, preferably about 36 to about 72 carbon atoms, and more preferably about 36 to about 54 carbon atoms, and particularly preferably about 36 carbon atoms. The hydrocarbon moiety may include cycloaliphatic or aromatic structures. Such materials may be prepared, for example, by addition reaction of unsaturated monofunctional fatty acids having 12 to 18 carbon atoms according to known methods, followed by conversion of the acid group to a carbamate group. The unsaturated fatty acids may be dimerized, trimerized, or tetramerized. Higher oligomer products are also possible, but not preferred. The acid groups may be converted to carbamate or urea groups by a number of known means. For example, the acid may be reduced to an alcohol group and then the alcohol group reacted with a hydroxy carbamate or urea compound such as hydroxypropyl carbamate or hydroxyethylene ethyl urea to introduce the carbamate functionality. Another method of synthesis involves reaction of an hydroxyl group with cyanic acid (which may be formed by the thermal decomposition of urea). Hydroxyl groups can also be converted to carbamate groups by reaction with low molecular weight monoisocyanates (e.g., methyl isocyanate, ethyl isocyanate, propyl isocyanate, and butyl isocyanate). An hydroxyl group can also be reacted with phosgene and then ammonia or a primary amine to form a carbamate group.

Preferred examples of such materials include compounds of the following structures:

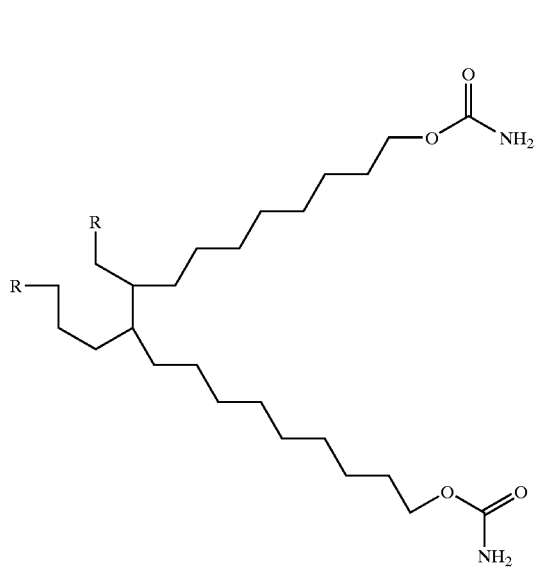

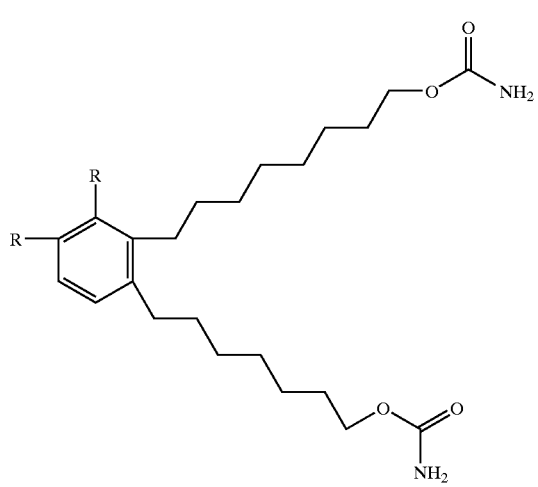

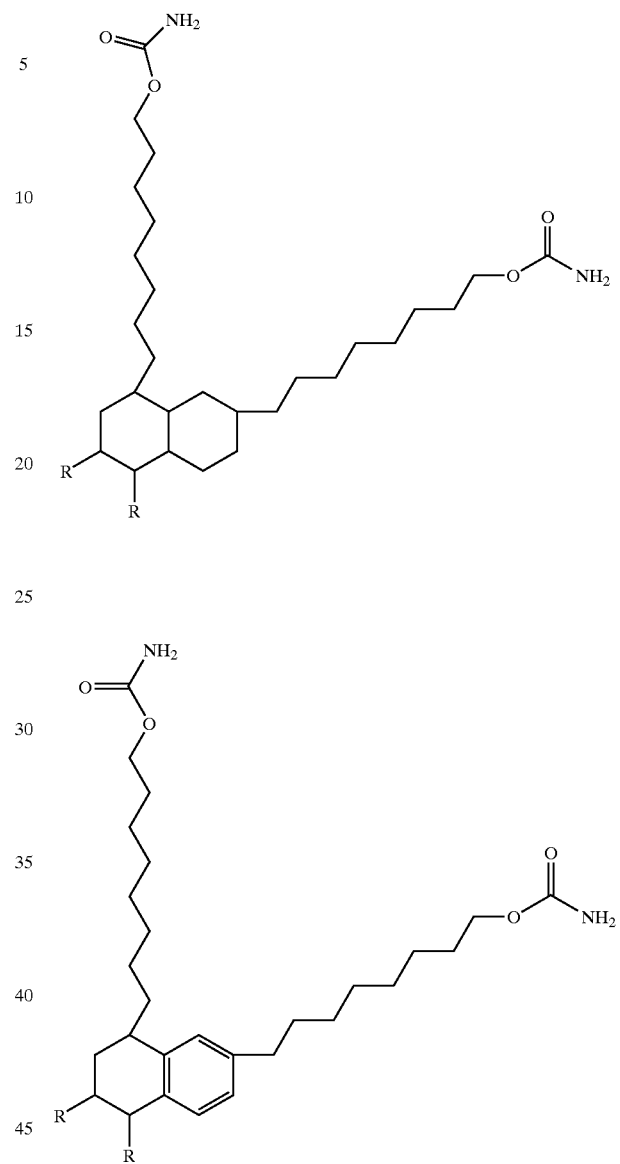

wherein each R group is independently an alkyl of 5 to 8 carbon atoms.

Any of these additional carbamate-functional materials may be included in the clearcoat composition in an amount of about 5 weight percent to about 30 weight percent, preferably from about 10 weight percent to about 15 weight percent, based on the vehicle weight.

The clearcoat coating composition further includes one or more crosslinkers reactive with active hydrogen groups. Particularly useful crosslinkers include, without limitation, materials having active methylol or methylalkoxy groups, such as aminoplast crosslinking agents or phenol/formaldehyde adducts. Examples of preferred curing agent compounds include melamine formaldehyde crosslinkers, including monomeric or polymeric melamine resin and partially or fully alkylated melamine resin, urea resins, and methylol ureas such as urea formaldehyde resin, alkoxy ureas such as butylated urea formaldehyde resin. Other useful crosslinkers include, without limitation, polyisocyanates and blocked polyisocyanates. The curing agent may be combinations of these. Aminoplast resins such as melamine formaldehyde resins or urea formaldehyde resins are especially preferred.

In preferred embodiments, the crosslinker is at least about 5%, more preferably at least about 10% by weight of the nonvolatile vehicle. "Nonvolatile vehicle" refers to the film-forming components. It is also preferred for the crosslinker to be up to about 40%, more preferably up to about 30% by weight of the nonvolatile vehicle. The crosslinker is preferably from about 5% to about 40%, more preferably from about 10% to about 35%, and still more preferably from about 15% to about 35% by weight of the nonvolatile vehicle.

The clearcoat coating composition may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluene sulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

A solvent or solvents may be utilized in the coating composition used in the practice of the present invention. In general, the solvent can be any organic solvent and/or water. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

The coating composition according to the invention is preferably utilized as the clearcoat of an automotive composite color-plus-clear coating. Additional agents, for example surfactants, stabilizers, wetting agents, rheology control agents, dispersing agents, adhesion promoters, UV absorbers, hindered amine light stabilizers, etc. may be incorporated into the coating composition. While such additives are well-known in the prior art, the amount used must be controlled to avoid adversely affecting the coating characteristics.

Coating compositions can be coated on the article by any of a number of techniques well-known in the art. These include, for example, spray coating, dip coating, roll coating, curtain coating, and the like. For automotive body panels, spray coating is preferred.

The coating composition according to the invention is used as the clearcoat of a composite color-plus-clear coating. The pigmented basecoat composition over which it is applied may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition is generally applied wet-on-wet over a basecoat coating composition as is widely done in the industry. The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the crosslinking agents, however they generally range between 90° C. and 180° C. In a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers; however, typical curing times range from 15 to 60 minutes, and preferably 15–25 minutes for blocked acid catalyzed systems and 10–20 minutes for unblocked acid catalyzed systems. The curing times may also be expressed as time after metal temperature reaches the bake temperature ("metal temperature"). For example, the curing time may be for 5 to 30 minutes, preferably 10 to 20 minutes, at metal temperature, The components of the clearcoat composition are selected so that the cured clearcoat film has a Knoop hardness of at least about 9, preferably at least about 11. The Knoop hardness is measured on the cured clearcoat film according to ASTM D 1474-98.

The invention is further described in the following example. The examples are merely illustrative and do not in any way limit the scope of the invention as described and claimed. All parts are parts by weight unless otherwise noted.

EXAMPLE 1 OF THE INVENTION

A clearcoat coating composition was prepared by combining 41 parts by weight of a primary carbamate-functional acrylic polymer (carbamate equivalent weight 425 grams per equivalent, 70% by weight nonvolatiles in organic solvent), 25.9 parts by weight of the reaction product of hydroxyalkyl carbamate and an isocyanurate (carbamate equivalent weight 379 grams per equivalent, 32% by weight nonvolatiles in organic solvent), 8.5 parts by weight of a secondary hydroxyl-functional acrylic polymer (secondary hydroxyl equivalent weight 308 grams per equivalent, 65% by weight nonvolatiles in organic solvent), 11.7 parts by weight of a melamine-formaldehyde resin (equivalent weight 118 grams per equivalent, 100% nonvolatiles by weight), 1.6 parts by weight of rheology control agent component (100% nonvolatiles by weight) dispersed in a portion of the primary carbamate-functional acrylic polymer, 6.3 parts by weight of customary paint additives, and 5 parts by weight of organic solvent to adjust the coating composition to spray viscosity.

Comparative Example A

A comparative clearcoat coating composition was prepared by combining 67 parts by weight of the primary carbamate-functional acrylic polymer from Example 1, 13 parts by weight of the reaction product of hydroxyalkyl carbamate and an isocyanurate from Example 1, 8.4 parts by weight of the melamine-formaldehyde resin from Example 1, 1.6 parts by weight of the rheology control agent component from Example 1 (again dispersed in a portion of the primary carbamate-functional acrylic polymer), 6.3 parts by weight of the paint additives of Example 1, and 3.8 parts by weight of organic solvent to adjust the coating composition to spray viscosity.

Testing of the Examples

Example 1 and Comparative Example A were applied wet-on-wet over various colors of commercial basecoat coating compositions on 100×300 mm panels and cured. The panels were then tested according to General Motors Engineering Standard GM9522P, "Knife Quick Adhesion Test for Stationary Glass Bonding Materials to Paint (Rev. A, 8/91), except that no glass bonding primer was used. Test environments were ambient air and 14 days at 100% relative humidity. The panels coated with Comparative Example A showed cohesive basecoat failures in post humidity testing, especially with the metallic effect colors. Adhesive failures were also observed with a number of solid color basecoat panels, both for ambient air and humidity exposure. the test panels coated with the Example 1 clearcoat composition passed all of the tests with 100% adhesion, both ambient air and humidity exposure.

The invention has been described in detail with reference to preferred embodiments thereof. It should be understood, however, that variations and modifications can be made within the spirit and scope of the invention.

What is claimed is:

1. A clearcoat coating composition, comprising
   (a) a least one member selected from the group consisting of
      (1) an acrylic polymer having both secondary hydroxyl functionality and functionality selected from the group consisting of carbamate functionality, urea functionality, and both carbamate and urea functionality and
      (2) a mixture of a first acrylic polymer with secondary hydroxyl functionality and a second acrylic polymer with functionality selected from the group consisting of carbamate functionality, urea functionality, and both carbamate and urea functionality,
      wherein said acrylic polymer or acrylic polymers of (a) have weight average molecular weights of at least about 2400;
   (b) a carbamate-functional or urea-functional material that is the reaction product of
      (1) a compound comprising a primary carbamate or primary urea group and an hydroxyl group and
      (2) a compound that is reactive with hydroxyl groups on a plurality of molecules of compound (1), but that is not reactive with the carbamate or urea groups on compound (1); and
   (c) a crosslinking component comprising a crosslinker reactive with active hydrogen groups.

2. A clearcoat coating composition according to claim 1, wherein said composition comprises acrylic polymer (a)(1).

3. A clearcoat coating composition according to claim 2, wherein said acrylic polymer (a)(1) has primary carbamate functionality.

4. A clearcoat coating composition according to claim 1, wherein said composition comprises mixture (a)(2).

5. A clearcoat coating composition according to claim 4, wherein said second acrylic polymer has primary carbamate functionality.

6. A clearcoat coating composition according to claim 1, wherein said secondary hydroxyl functionality is formed by reaction of a glycidyl group with a carboxylic acid group.

7. A clearcoat coating composition according to claim 1, wherein said acrylic polymer or acrylic polymers of (a) have weight average molecular weights of at least about 4000.

8. A clearcoat coating composition according to claim 1, wherein said acrylic polymer or acrylic polymers of (a) have weight average molecular weights of up to about 5000.

9. A clearcoat coating composition according to claim 1, wherein said acrylic polymer (a)(1) or said first acrylic polymer of (a)(2) has an hydroxyl equivalent weight of up to about 600 grams per equivalent.

10. A clearcoat coating composition according to claim 1, wherein said acrylic polymer (a)(1) or said first acrylic polymer of (a)(2) has an hydroxyl equivalent weight of at least about 150 grams per equivalent.

11. A clearcoat coating composition according to claim 1, wherein said acrylic polymer (a)(1) or said second acrylic polymer of (a)(2) has a carbamate equivalent weight of up to about 700 grams per equivalent.

12. A clearcoat coating composition according to claim 1, wherein said acrylic polymer (a)(1) or said second acrylic polymer of (a)(2) has a carbamate equivalent weight of at least about 350 grams per equivalent.

13. A clearcoat coating composition according to claim 1, wherein compound (b)(1) is a member selected from the group consisting of hydroxyethyl carbamate, hydroxypropyl carbamate, and hydroxybutyl carbamate.

14. A clearcoat coating composition according to claim 1, wherein compound (b)(2) is a member selected from the group consisting of the isocyanurate of isophorone diisocyanate and the isocyanurate of hexamethylene diisocyanate.

15. A clearcoat coating composition according to claim 1, wherein the clearcoat coating composition comprises about 5 weight percent to about 30 weight percent of the compound (b), based on the vehicle weight.

16. A clearcoat coating composition according to claim 1, wherein the clearcoat coating composition comprises about 10 weight percent to about 15 weight percent of the compound (b), based on the vehicle weight.

17. A clearcoat coating composition according to claim 1, further comprising a carbamate-functional or urea-functional material comprising at least two functional groups, at least one of which is a carbamate or urea group that is the reaction product of
   (1) an hydroxyl group of a first compound that is the result of a ring-opening reaction between a compound with an epoxy group and a compound with an organic acid group and
   (2) cyanic acid or a carbamate or urea group-containing compound.

18. A clearcoat coating composition according to claim 1, further comprising a carbamate-functional or urea-functional material that is the reaction product of
   (1) a compound comprising a carbamate or urea group and an active hydrogen group that is reactive with (2), and
   (2) a lactone or a hydroxy carboxylic acid.

19. A clearcoat coating composition according to claim 1, further comprising a carbamate-functional or urea-functional material that is the reaction product of
   (A) the reaction product of
      (1) a compound comprising a primary carbamate or primary urea group and an hydroxyl group and
      (2) a lactone or a hydroxy carboxylic acid and
   (B) a compound that is reactive with hydroxyl groups on a plurality of molecules of compound (A), but that is not reactive with the carbamate or urea groups on compound (A).

20. A clearcoat coating composition according to claim 1, further comprising a carbamate-functional or urea-functional material that is the reaction product of
   (A) the reaction product of
      (1) a compound comprising a primary carbamate or primary urea group and an hydroxyl group and
      (2) a lactone or a hydroxy carboxylic acid and
   (B) a compound that converts an hydroxyl group on (A) to a carbamate group, or a compound comprising a group that is reactive with a hydroxyl group and a carbamate or urea group or group that can be converted to carbamate or urea.

21. A clearcoat coating composition according to claim 1, further comprising a carbamate-functional material that is the reaction product of
   (1) a first material that is the reaction product of a mixture including at least a polyisocyanate and an active hydrogen-containing chain extension agent with
   (2) a compound comprising a group that is reactive with said first material and a carbamate group or group that can be converted to a carbamate group.

22. A clearcoat coating composition according to claim 1, comprising a further material having at least two carbamate groups and a hydrocarbon moiety having about 24 to about 72 carbon atoms.

23. A clearcoat coating composition according to claim 22, wherein the further material has from two to four carbamate groups.

24. A clearcoat coating composition according to claim 22, wherein the further material has two carbamate groups.

25. A clearcoat coating composition according to claim 22, wherein the hydrocarbon moiety has from about 36 to about 72 carbon atoms.

26. A clearcoat coating composition according to claim 22, wherein the hydrocarbon moiety has from about 36 to about 54 carbon atoms.

27. A clearcoat coating composition according to claim 22, wherein the hydrocarbon moiety has about 36 carbon atoms.

28. A clearcoat coating composition according to claim 1, comprising a further material having a structure selected from the group consisting of

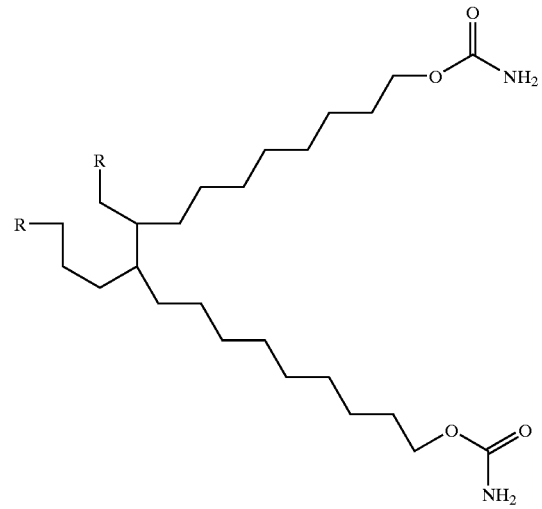

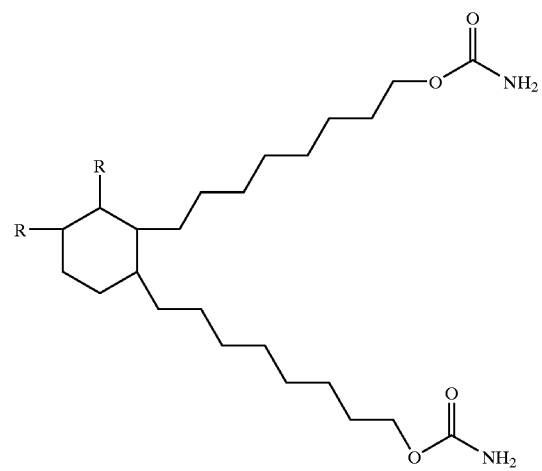

-continued
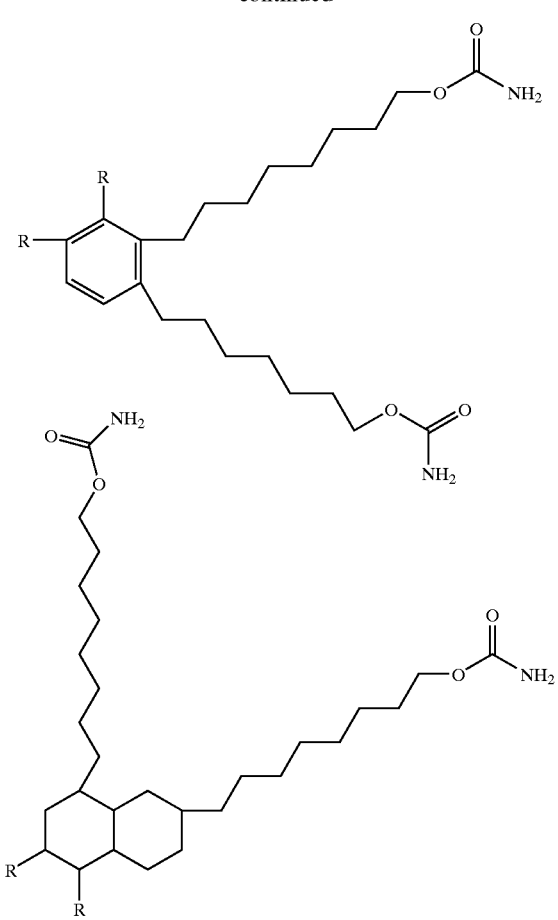
-continued
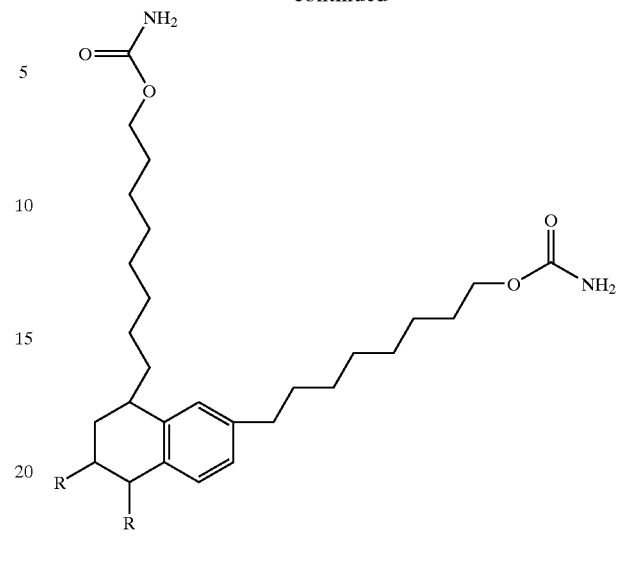
wherein each R group is independently an alkyl of 5 to 8 carbon atoms.
29. A clearcoat coating composition according to claim 1, wherein (c) is an aminoplast crosslinker.
30. A clearcoat coating composition according to claim 1, wherein (c) is a melamine formaldehyde crosslinker.
* * * * *